3,271,172
DOLOMITE BRICK AND METHOD OF MAKING IT
William H. Powers, Franklin Township, Westmoreland County, and Charles K. Russell, Monroeville, Pa., assignors to United States Steel Corporation, a corporation of New Jersey
No Drawing. Filed Mar. 3, 1965, Ser. No. 436,951
4 Claims. (Cl. 106—61)

This invention relates to an improved dead-burned dolomite refractory brick and to a method of making it.

Conventionally dead-burned dolomite refractory is prepared by burning raw dolomite in a rotary kiln and adding a small percentage of iron oxide. The iron oxide improves the grain density and provides a coating of calcium ferrite on the outside of the grains. This coating affords some protection against hydration of the lime. Dead-burned dolomite thus prepared has been used chiefly in granular form for maintaining refractory furnace bottoms. Although efforts have been made to use this relatively cheap material to replace more expensive magnesite or periclase refractories in other applications, its inability to resist hydration has greatly limited such uses.

Recently a process has been developed in which raw dolomite is lightly calcined, the calcined product is briquetted, and the briquettes fired in a shaft kiln at temperatures of about 3500 to 3800° F. Even though the material has a low flux content (less than 1 percent iron oxide), bricks made from it show greatly improved resistance to hydration and slag compared with bricks made from older type dead-burned dolomite. One disadvantage is that it is necessary to fire this material at extremely high temperatures which necessitate the use of a shaft kiln.

An object of our invention is to provide an improved dead-burned dolomite brick and method of making it in which we fire the material at lower temperatures, preferably in a conventional rotary kiln.

A further object is to provide a brick and method of the foregoing type in which we incorporate a small percentage of strontium oxide to improve the properties of the material.

According to our invention, we lightly calcine raw dolomite at a temperature of about 1800 to 2500° F. Either before or after calcining, we mix with the dolomite about 1 to 5 percent strontium oxide. Conveniently the strontium oxide can be added in carbonate form, which later calcines to form the oxide. Nevertheless we can of course use strontium oxide which already has been calcined. Next we briquette the calcined product. We then fire the briquettes at a minimum temperature of about 3100° F., or preferably about 3200 to 3300° F. We can reach these temperatures in a conventional rotary kiln, making it unnecessary to use a shaft kiln. The fired product has a low flux content (preferably less than 1 percent iron oxide present only as an impurity). Strontium oxide is a base and has no fluxing action on lime and magnesia of the burned dolomite. Bricks made by our method show good resistance to hydration.

As an example to demonstrate how our invention operates, we made a series of bricks by calcinating low flux dolomite at 2000° F., adding strontium oxide in varying proportions, briquetting the calcined product, and firing the briquettes at 3100° F. We then measured the porosity and also the percent fines after 12 hours at 160° F. and 98 percent relative humidity. The latter measurement furnishes an indication of the resistance to hydration. The results were as follows:

| Base material | Percent SrO (added as carbonate) | Apparent porosity, percent | Hydration resistance, percent |
|---|---|---|---|
| Low-flux dolomite (pre-calcined to 2,000° F. and briquetted) | 0.0 | 13–16 | 5.1 |
|  | 1.0 | 4–5 | 0.8 |
|  | 2.0 | 4–5 | 0.5 |
|  | 3.6 | 5 | 0.8 |
|  | 4.6 | 5 | 1.4 |
| Low-flux dolomite (not calcined) | 0.0 | 18–19 | 11.5 |
|  | 2.0 | 15–16 | 61.3 |
|  | 4.6 | 15–16 | 16.5 |

While we have shown and described certain preferred embodiments of our invention, it is apparent that modifications may arise. Therefore, we do not wish to be limited to the disclosure set forth but only by the scope of the appended claims.

We claim:
1. A refractory brick consisting of dead-burned dolomite and strontium oxide, the content of the latter being about 1 to 5 percent.
2. A refractory brick as defined in claim 1 having a maximum iron oxide content of about 1 percent present only as an impurity.
3. A method of making a dead-burned dolomite brick comprising calcining dolomite at a temperature of 1800 to 2500° F., mixing about 1 to 5 percent strontium oxide with the dolomite, briquetting the mixture, and firing the briquettes at a minimum temperature of about 3100° F.
4. A method as defined in claim 3 in which the briquettes are fired at a temperature of about 3100 to 3300° F. in a rotary kiln.

References Cited by the Examiner
UNITED STATES PATENTS

| | | | |
|---|---|---|---|
| 1,063,102 | 5/1913 | Baker | 106—58 |
| 2,076,884 | 4/1937 | Ermould | 106—61 |
| 2,410,359 | 10/1946 | Perry et al. | 106—58 |

TOBIAS E. LEVOW, *Primary Examiner.*

J. E. POER, *Assistant Examiner.*